United States Patent
Tan et al.

(10) Patent No.: US 6,853,933 B2
(45) Date of Patent: Feb. 8, 2005

(54) METHOD OF IDENTIFYING SPECTRAL IMPULSES FOR RJ DJ SEPARATION

(75) Inventors: Kan Tan, Beaverton, OR (US); Mark L. Guenther, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 10/376,107

(22) Filed: Feb. 26, 2003

(65) Prior Publication Data

US 2003/0163268 A1 Aug. 28, 2003

Related U.S. Application Data

(60) Provisional application No. 60/360,192, filed on Feb. 26, 2002.

(51) Int. Cl.[7] .................. G01R 23/16; G01R 13/00; H04B 17/00
(52) U.S. Cl. .................. 702/76; 702/69; 702/77; 375/226
(58) Field of Search .................. 702/66, 67, 69, 702/75, 76, 77; 375/224, 226, 227

(56) References Cited

U.S. PATENT DOCUMENTS

2002/0075951 A1 * 6/2002 Pearson .................. 375/226

OTHER PUBLICATIONS

Provisional application 60/240,830 filed on Oct. 17, 2000.*

* cited by examiner

Primary Examiner—John Barlow
Assistant Examiner—Meagan S Walling
(74) Attorney, Agent, or Firm—Thomas F. Lenihan

(57) ABSTRACT

A method for identifying spectral impulses applies a window filter to an acquired waveform to produce a filtered waveform, and performs an FFT function on the filtered waveform to produce a spectrum of bins. An estimating window is located on the spectrum and centered on a target bin. Bins adjacent to the target bin are excluded and the remaining bins are used to form a noise estimate. The estimate is compared to the target bin and if the result exceeds a threshold value, a spectral impulse is identified.

7 Claims, 2 Drawing Sheets

METHOD OF IDENTIFYING SPECTRAL IMPULSES FOR RJ DJ SEPARATION

CLAIM FOR PRIORITY

The subject application claims priority from U.S. Provisional Patent Application Ser. No. 60/360,192, entitled, IMPROVED METHOD OF IDENTIFYING SPECTRAL IMPULSES FOR RJ DJ SEPARATION (Tan et al.), filed 26 Feb. 2002.

FIELD OF THE INVENTION

The subject invention concerns the field of digital signal processing in general and specifically concerns a method of identifying spectral impulses for RjDj separation.

BACKGROUND OF THE INVENTION

The separation of signal jitter into various components, such as Random Jitter (Rj) and Deterministic Jitter (Dj) helps to identify possible causes of errors in the signals and allows estimation of system error rates. This is quite useful in the analysis of edge jitter in serial data communications signals and in signals from computer busses. This jitter separation is referred to as RjDj separation, can be accomplished by a number of techniques, including those based on spectral analysis.

For RjDj separation techniques that rely on spectral analysis, a key problem is that of identifying spectral impulses that signify narrowband deterministic signals, as distinguished from gaussian noise. The reliability and repeatability of this identification process has a direct bearing on the accuracy of the RjDj estimates.

The identification of narrowband deterministic signals that are masked by additive noise is a signal-processing problem that has been investigated at length. Radar target detection and estimation require consideration of this problem as is known from, Detection of Signals in Noise by Anthony D. Whalen, Academic Press, New York, 1971. It is also known that some medical diagnostic techniques require consideration of this problem.

International Patent Application Publication WO 99/39216, entitled Method and Apparatus for Jitter Analysis, to WaveCrest Corporation, teaches a particular method (to be described below) in the specific field of RjDj separation.

SUMMARY OF THE INVENTION

A method for identifying spectral impulses applies a processing window to an acquired waveform to produce a filtered waveform, and performs an FFT function on the filtered waveform to produce a spectrum of bins. An estimating window is located on the spectrum and centered on a target bin. Bins adjacent to the target bin are excluded and the remaining bins are used to choose a representative value for the group. The representative value is compared to the target bin and if the result exceeds a threshold value, a spectral impulse is identified.

DETAILED DESCRIPTION OF THE DRAWING

It is well known by those skilled in the art that a processing window may be applied to a signal before it is Fourier-transformed, in order to prevent spectral leakage in the frequency domain. If the Fourier transform is a discrete Fourier transform, the combination of processing window and transform produces a frequency spectrum composed of magnitude bins equally-spaced along the frequency axis. This spectrum is conducive to locating the signal impulses that represent deterministic signal components. This technique is reviewed in, On the Use of Windows for Harmonic Analysis with the Discrete Fourier Transform by Fredric J. Harris, Proceedings of the IEEE, Vol 66, No. 1, January 1978.

The method of International Patent Application Publication WO 99/39216 involves sliding an estimating window over the frequency spectrum of interest, and comparing the central value in that window against some kind of an average over the width of the window to determine if the central value constitutes a signal impulse. A window with an odd number of bins, say N, is slid along the spectrum one bin at a time.

Figure 1:
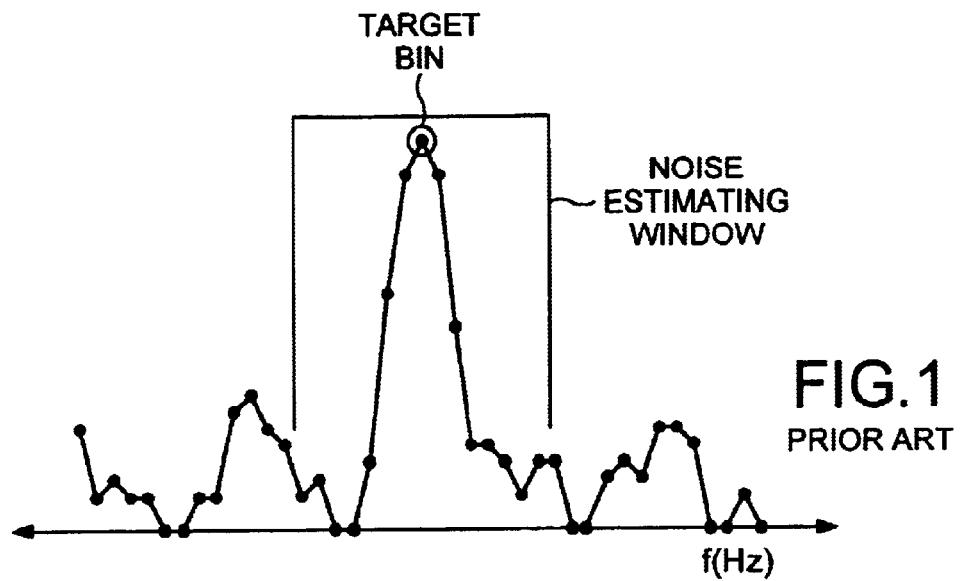
FIG. 1 shows a representative spectrum and an estimating window, as known from the prior art.

FIG. 1 shows a representative spectrum and an estimating window having a width of N=15 (for the cited reference, N=9 was used). For each window location, the magnitude of the center bin is compared to the mean value of the magnitudes of the other N−1 bins. If the magnitude of the center bin exceeds this mean value by a chosen threshold, the bin is considered to represent a deterministic signal. That is, the prior art method of impulse-finding slides an estimating window over the spectrum in order to estimate the localized noise floor in an adaptive manner.

Figure 2:
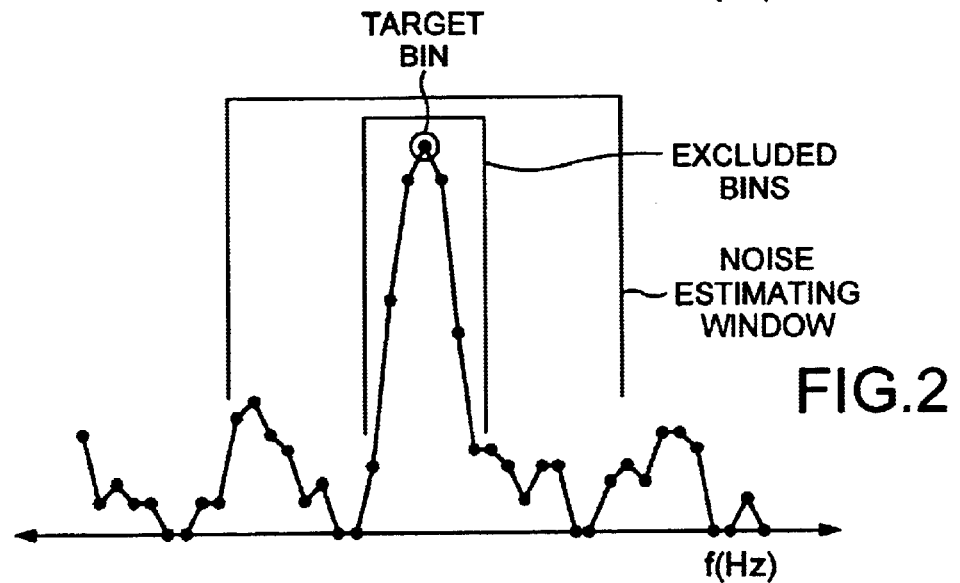
FIG. 2 shows a representative spectrum, an exclusion window, and an estimating window, in accordance with the subject invention.
Figure 3:
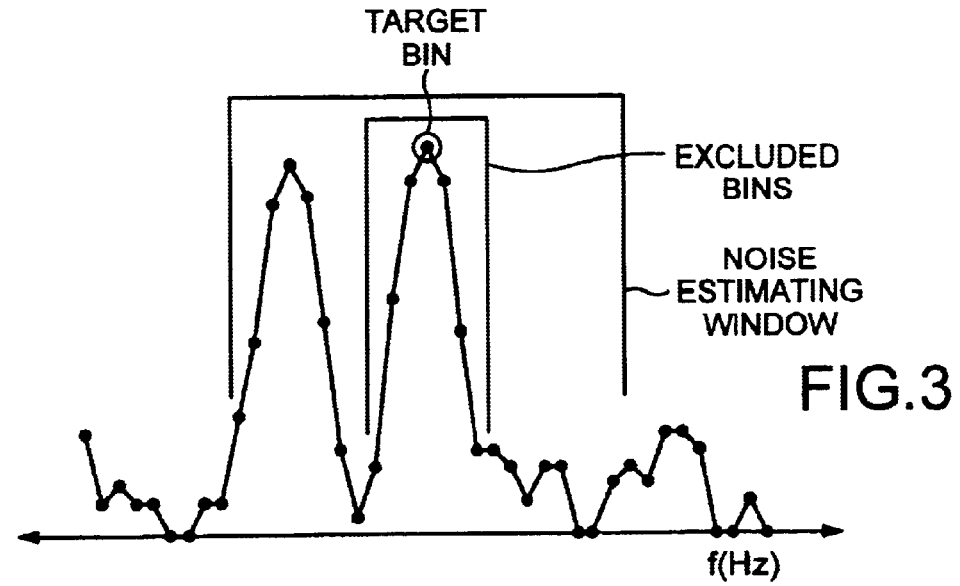
FIG. 3 shows a second representative spectrum, an exclusion window, and an estimating window, in accordance with the subject invention.

The subject invention will now be described with respect to the graphs of FIGS. 2 and 3, and the flowchart of FIG. 4. Referring to FIG. 2, within the estimating window, the frequency bins that are immediately adjacent to the "target" bin (at the center of the window) are excluded from the noise estimate. The number of bins excluded on each side of the target bin is determined by the bandwidth of the main lobe of the processing window, as will be described subsequently. The motivation for this exclusion is illustrated in FIG. 2, where it can be seen that the processing window has caused two bins on each side of the narrowband signal bin to have amplitudes that are not representative of the localized noise. As FIG. 2 illustrates, these bins and the target bin are excluded from consideration in the noise estimate.

For those bins inside the noise estimating window but not excluded from consideration, a representative noise estimate is found. The mean value of these bins is one representative estimate. In one embodiment of the invention, a median filter is used instead of a mean-value filter. Alternatively, a median filter may be used to select the central M bins from an N-bin set, and then a mean-value filter applied to the remaining M bins. Other methods may also be used to select a representative noise estimate from the included bins.

In order to find groups of closely-spaced impulses that might escape the first stage of the impulse-finder, a second estimating window may be applied. This second stage would work in substantially the same way as the first stage, but the width of the estimating window would be increased and the decision threshold would not necessarily be the same. The final set of bins that would be considered impulses, are those bins that passed either the first or the second stages.

As noted above, before the time record is converted to a frequency spectrum via an FFT, a processing window must be applied. When considered in the frequency domain, this processing window has a main lobe that is typically about six bins wide at the −50 dB point, and has the effect of spreading any narrowband signal energy over this width. Thus, bins that are immediately adjacent to a narrowband signal are more representative of the narrowband signal than of the local noise level. By excluding these bins from those used to estimate the noise, a better estimate is obtained.

An estimating window is used to estimate the noise level in the vicinity of each bin to evaluate that bin for the presence of narrowband signal energy (i.e. an impulse). However, if a second impulse lies within the estimating window, as shown in FIG. 3, the noise level estimate will be biased upward so that the first impulse might not be detected. The use of a median filter prior to, or instead of, a mean-value filter causes any extreme values within the estimating window to be entirely discarded, thus minimizing the impact of nearby signal impulses.

Figure 4:
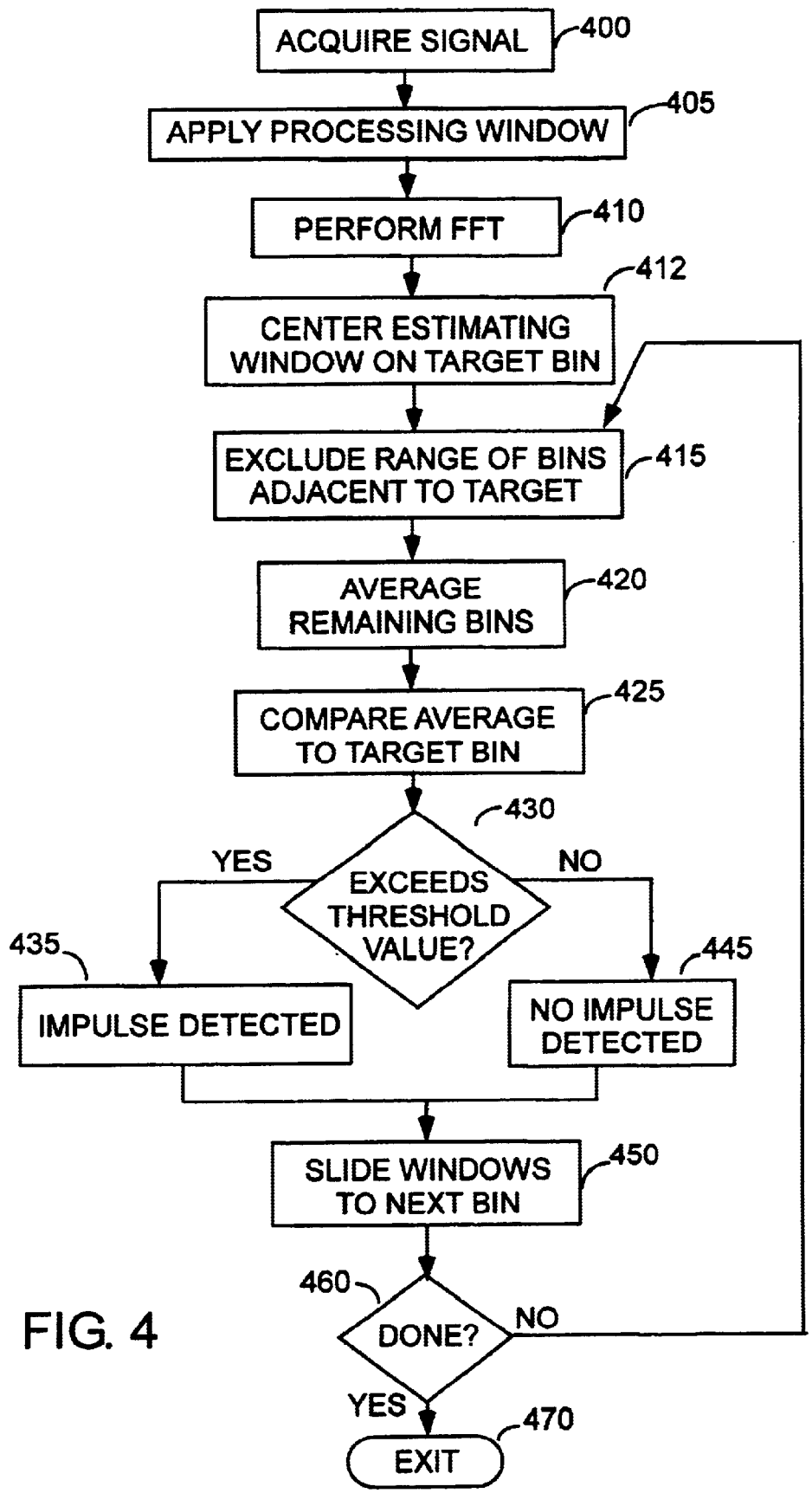
FIG. 4 is a flowchart of a method in accordance with the subject invention.

The method illustrated in the flowchart of FIG. 4 is entered at step 400 wherein a waveform of interest is acquired by a test and measurement instrument, such as an oscilloscope. In step 405 a processing window is applied to the acquired waveform prior to the performance of an FFT function at step 410. At step 412 an estimating window having a predetermined width is centered on the target bin. The estimating window thereby encompasses a first predetermined range of bins. At step 415, a second predetermined range of bins, adjacent to the target bin, are excluded. As mentioned above, the size of this range is smaller than the first predetermined range, and is dependent upon the width of the main lobe of the window filter applied in step 405.

In step 420, the remaining bins lying within the estimating window are used to form a noise estimate for comparison with the target bin in step 425. At step 430 the results of the comparison are compared to a predetermined threshold value and a determination is made as to whether or not the threshold value has been exceeded.

If the threshold value was exceeded, the YES path is taken to step 435 wherein a detection of an impulse at the current target bin is recorded for later use. If the threshold value was not exceeded the NO path is taken to step 445 wherein a no such detection of an impulse at the current target bin is recorded for later use. In either case, the procedure advances to step 450 wherein the windows are slid to the next bin. One skilled in the art will recognize that step 445 is for explanatory purposes only, and a practical procedure would advance from step 430 along the NO path directly to step 450.

At step 460 a determination is made of whether or not the last bin of the spectrum has been reached. If so the procedure is exited at step 470. If not, the procedure "loops" to step 415 applies the impulse-finding method to the newly selected bin.

It is herein recognized that the use of multiple, parallel impulse-finding stages with estimating windows of various widths allows groups of closely-spaced impulses to be detected.

It is herein recognized that the method of the subject invention is particularly useful in jitter measurement software for use in a digital storage oscilloscope.

What is claimed is:

1. A method for identifying spectral impulses, comprising the steps of:

applying a processing window to an acquired waveform to produce a filtered waveform;

performing an FFT function on said filtered waveform to produce a spectrum of bins, said bins being evenly spaced in frequency;

selecting a target bin and a first predetermined range of bins by locating an estimating window on said spectrum and centered on said target bin;

excluding a second predetermined range of bins adjacent to said target bin, said second predetermined range of bins being smaller than said first predetermined range of bins;

forming a noise estimate from remaining bins, other than said target bin and said excluded bins, lying within said estimating window;

comparing said noise estimate to said target bin to produce a result; and identifying a spectral impulse when a result of said comparison exceeds a predetermined threshold.

2. The method of claim 1 wherein the size of said second predetermined range of bins is dependent upon a characteristic of said processing window.

3. The method of claim 1 wherein said noise estimate is found using a median filter.

4. The method of claim 1 wherein said noise estimate is found using a median filter followed by a mean-value filter.

5. A method for identifying spectral impulses, comprising the steps of:

filtering an acquired waveform using a processing window;

converting said waveform from a time domain representation into a frequency domain representation encompassing a given spectrum;

locating an estimating window on said spectrum by centering said estimating window on a target frequency value;

excluding a frequency range adjacent to said target frequency that is more representative of said target frequency than of noise;

forming a noise estimate from the frequencies, except for those within said excluded frequency range, lying within said estimating window;

comparing said noise estimate to said target frequency to produce a result; and identifying a spectral impulse when a result of said comparison exceeds a predetermined threshold.

6. The method of claim 5 wherein a width of said excluded frequency range is dependent upon a characteristic of said processing window.

7. A method for identifying spectral impulses, comprising the steps of:

filtering an acquired waveform using a processing window;

converting said waveform from a time domain representation into a frequency domain representation encompassing a given spectrum;

locating a first estimating window on said spectrum by centering said estimating window on a target frequency value;

excluding a frequency range adjacent to said target frequency that is more representative of said target frequency than of noise;

forming a noise estimate from the frequencies, except for those within said excluded frequency range, lying within said estimating window;

comparing said noise estimate to said target frequency to produce a first result;

locating a second estimating window on said spectrum by centering said estimating window on a target frequency value; said second estimating window having a greater width than said first estimating window;

excluding a frequency range adjacent to said target frequency that is more representative of said target frequency than of noise;

forming a noise estimate from the frequencies, except for those within said excluded frequency range, lying within said estimating window;

comparing said noise estimate to said target frequency to produce a second result; and identifying a spectral impulse when a result of said first comparison exceeds a first predetermined threshold, or when a result of said second comparison exceeds a second predetermined threshold.

* * * * *